United States Patent

[11] 3,593,078

| [72] | Inventors | Ernest H. Domshy |
| | | Downey; |
| | | Victor Moller, Sierra Madra, both of, Calif. |
| [21] | Appl. No. | 855,998 |
| [22] | Filed | Sept. 8, 1969 |
| [45] | Patented | July 13, 1971 |
| [73] | Assignee | North American Rockwell Corporation |

[54] STARTING AND OPERATING CONTROL FOR AN AC MOTOR POWERED BY A DC POWER SUPPLY
7 Claims, 1 Drawing Fig.

[52] U.S. Cl. .................................................. 318/180, 318/227
[51] Int. Cl. ...................................................... H02p 1/46
[50] Field of Search ............................................. 318/178, 179, 180, 227

[56]            References Cited
        UNITED STATES PATENTS
2,146,778   2/1939   Swanson ........................ 318/180 X
3,189,810   6/1965   MacGregor .................... 318/227

Primary Examiner—Gene Z. Rubinson
Attorneys—L. Lee Humphries, Charles F. Dischler and Sidney Magnes ABSTRACT: An AC Motor Control, wherein the AC motor is powered by a DC power supply through a DC to AC converter circuit, and wherein the control has an AC current sensor for producing a current signal indicative of the current supplied to the motor which signal is coupled to the converter to prevent excessive current drain on the power supply under starting condition and an AC voltage sensor for producing a voltage signal indicative of the potential across the motor leads and this voltage signal is used to control the converter under operating conditions so that synchronous speed is maintained. Since, under operating condition, the current is inherently substantially stable at rated current, a switch is incorporated responsive to the current signal at rated current to decouple the current signal from the converter and couple the voltage signal thereto.

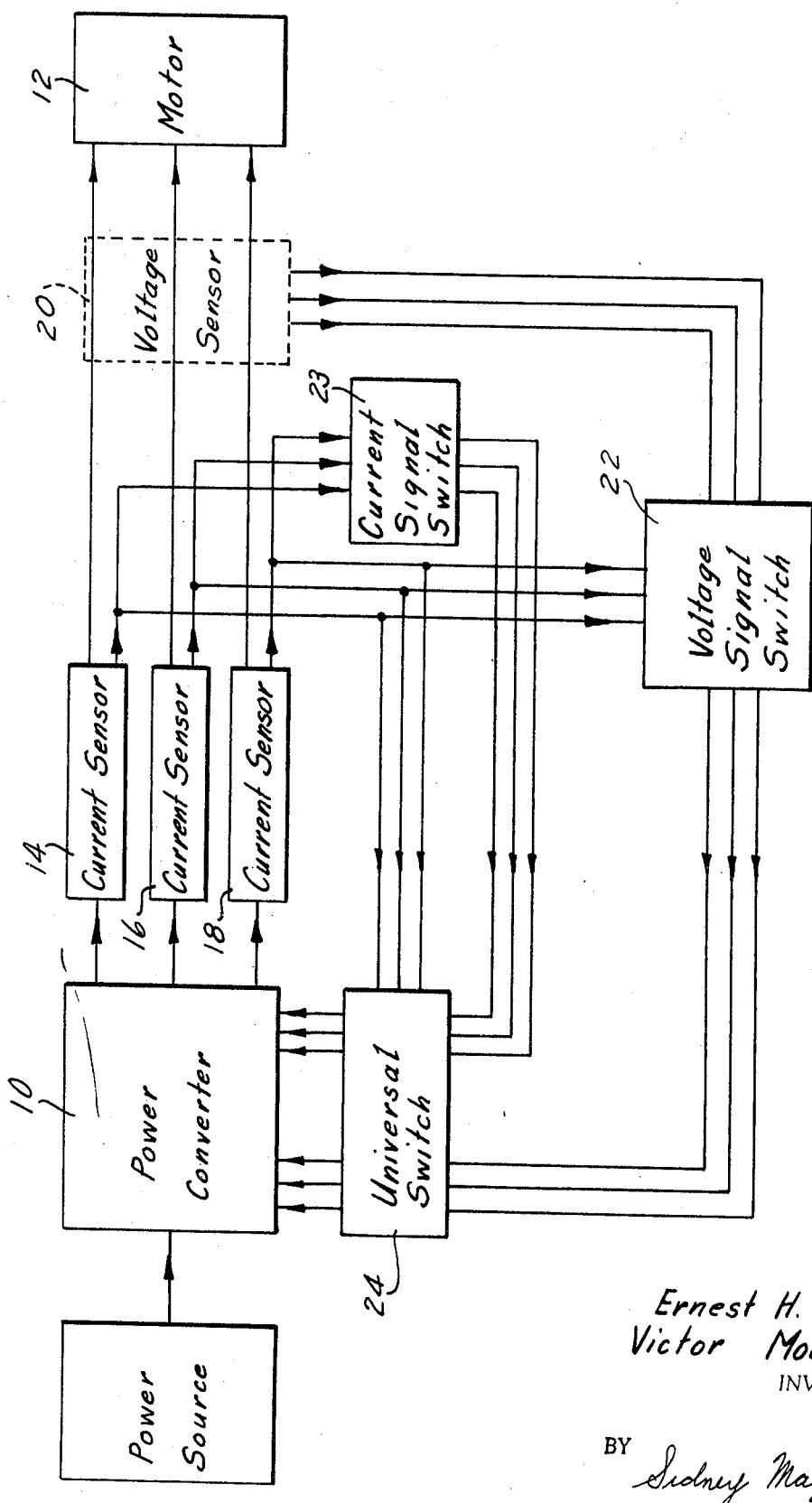

3,593,078

STARTING AND OPERATING CONTROL FOR AN AC MOTOR POWERED BY A DC POWER SUPPLY

BACKGROUND

It is well known that when an electric motor first starts to rotate, there is an "inrush" current that has a much higher amplitude than the normal operating current. This inrush current permits the motor to quickly accelerate to its design speed; whereupon the motor then stabilizes, and takes its design operating current.

If a motor is to operate from a battery, from a power converter (DC-to-AC; AC-to-DC), or the like, the inrush current requires that these elements must be able to supply the extremely large inrush current; and—when a converter is used—this generally results in a converter that is unduly large and heavy. Since the converter has its own inherent internal power-consumption that is a function of its size, the conventional large converter consumes significant power of its own; this power inefficiency necessitates the use of an unduly large and heavy primary power source (e.g. battery, generator, alternator, etc.). Thus, the large inrush current requires a large converter and a large power supply.

In many applications—such as scuba diving, submersibles, etc.—weight and size must be kept to a minimum; and it therefore becomes desirable to minimize both the converter and the power source. Unfortunately, in the past, this has been unfeasible.

OBJECTS AND DRAWINGS

It is therefore an object of the present invention to provide improved apparatus for operating electric motors.

The obtainment of this object and others will be realized from the following detailed description, taken in conjunction with the drawing which shows a block diagram of circuitry for achieving the desired result.

INTRODUCTION

As pointed out above, an electric motor has a large starting inrush current; and, in some types of motors, the inrush current may be as much as ten times as large as the motor's normal operating current.

It has been found that—in many cases—if the value of the inrush current is limited to substantially the same value as the normal operating current, the acceleration time of the motor is increased by a small factor of about 10 percent to 15 percent; whereas the size and weight of the converter can be reduced by as much as 300 percent. The inherently increased efficiency of the smaller converter now permits use of a 30 percent to 40 percent smaller power source.

SYNOPSIS

Broadly speaking, the present disclosure suggests that during "run-up" of the motor, the converter be limited in such a way that its maximum output current has a value that is substantially equal to the normal motor-operating current. In this way, the inrush current and the resultant large, heavy converter and power source are minimized; and the motor achieves its design speed after a slightly longer acceleration interval. At that time, a voltage control circuit takes over.

DISCLOSURE

Attention is now directed to the drawing, which shows a power-converter 10 for providing the necessary electrical power to a motor 12. Converter 10 may be of any suitable type—illustrated as an "inverter" that operates from a DC power source, and produces three-phase electrical power for the three-phase synchronous motor 12.

In order to monitor the current taken by the motor, a suitable number of current sensors are used to sense the current drawn by motor 12; the illustration showing three current sensors 14, 16, and 18 connected respectively in the separate power lines. These sensors—which may be of the transformer or resistor type—thus produce current sensor control signals that correspond to the instantaneous current magnitudes.

In operation, when motor 12 is started, the incipient inrush current is detected by the current sensors; and the resultant current sensor control signals are applied to converter 10. Here, the current sensor control signals reduce the incipient inrush current in each line to a value that is substantially equal to the normal operating current.

It should be noted that the converter is not shut off by the presence of a large current; but rather is limited to the normal value of operating current. If the converter were shut off, as happens in some protective circuits, a new inrush current would be produced when the circuit was again enabled; and this would worsen, rather than solve, the problem. The disclosed circuit minimizes this inrush current effect, by limiting the value of the inrush current to the value of the normal operating current.

To recapitulate, the inrush current produces a current sensor control signal that causes the converter to reduce the output current in respective power lines; this current reduction being an instantaneous response to the inrush current. As the motor accelerates, the inrush current decreases; and the current sensor control signals regulate converter 10 to maintain the normal operating current value. This control action is progressive; and eventually the motor has accelerated to its design speed, and is stabilized at its design operating current.

At this stabilized state, the current sensors produce minimal signals; or else produce signals of such small magnitude that they have no effect on converter 10.

It will be noted that during this time interval the converter has not been required to provide any more current than is needed for normal motor operation. In this way the converter may be designed to provide only the value of current needed for normal motor operation; and this results in a smaller, lighter weight cooler and more efficient converter.

It is well known that if motor 12 is of the synchronous type, the voltage across the motor increases sharply to a predetermined value when the motor achieves synchronous speed. The drawing shows a voltage sensor 20, which may be of the transformer type, connected between one or more of the power lines; and voltage sensor 20—which until now has not had any effect—now produces a voltage control signal in accordance with the increased voltage that occurs at synchronous speed. At this time the resultant voltage sensor signal is applied to converter 10 to substitute for the current control signals previously produced by the current sensor.

Alternatively, one or more of the current sensor control signals from sensors 14, 16, and/or 18 may be used to connect/disconnect a voltage signal switch 22 that controls the application of the voltage sensor control signal(s) from voltage sensor 20 to converter 10. Similarily the current sensor control signals may also be used to disconnect/connect a current signal switch 23 that controls the application of the current sensor control signal(s) from the current sensors to converter 10. In this manner, the instant or the mode of motor control can be regulated, or, if desired, the current sensor signals may control a universal switch 24 that determines which control signals are applied to the converter.

In this way, the disclosed arrangement provides an improved converter for a motor; and assures that, during normal operation, the motor receives a suitable voltage to prevent it from losing synchronism. It should be noted, in passing, that at times the current and voltage sensors may be advantageously incorporated into the power-converter assembly.

Converters such as 10 are well known; and they generally contain an arrangement for regulating their outputs. For example, attention is directed to the article "Three-Phase Static Inverters for Power Space-Vehicle Equipment" by Kearns and Rolf, *TUNNEL-DIODE AND SEMI-CONDUCTOR CIRCUITS*, McGraw-Hill Book Company, Inc., 1953, pages 312—315. In this article, the circuitry of FIG. 1 shows pulse width modulators that may be controlled in accordance with the teachings of the present disclosure, in order to control the output. Attention is also directed to the article "Static Inverter Delivers Regulated 3-Phase Power" by Lilenstein, appearing in TUNNEL-DIODE AND SEMI-CONDUCTOR CIRCUITS, McGraw-Hill Book Company, Inc., 1953, pages 355—350. This article shows in FIG. 1, an inverter having a plurality of single-phase magnetic amplifiers that may be controlled in accordance with the teachings of the present disclosure. Other converter circuits are well known; and are readily modifiable to produce the advantages of the present disclosure by controlling the current and/or voltage produced by the converter.

The sequence of described events is such as to bring the motor to synchronous speed in the most efficient current-limiting manner; and to then provide optimal motor operation, by maintaining the motor input-voltage within its design operational range. This voltage control prevents motor speed falloff (i.e., motor desynchronization during normal motor operation. The disclosed smaller and more efficient converter results in reduced converter weight and size, as well as in reduction of the weight and size of the required power source.

What I claim is:

1. In combination with a motor whose starting inrush current is substantially larger than said motor's normal operating current, the combination comprising:

controllable power means for providing controllable current and voltage to said motor;

limiting means for continually limiting the output current from said power means to a value that is substantially equal to the value of said motor's normal operating current;

said limiting means comprising: current sensor means for sensing the instantaneous current drawn by said motor, and producing a current sensor control signal corresponding to said instantaneous motor current; and means for applying said current sensor control signal to said controllable power means for limiting the output current from said power means to a value substantially equal to the value of said motor's normal operating current;

voltage control means for controlling the output voltage from said power means to a value suitable to maintain motor synchronism, said voltage control means comprising voltage sensor means for sensing the instantaneous voltage at said motor, and producing a voltage sensor control signal corresponding to said instantaneous voltage; means for applying said voltage sensor control signal to said controllable power means; means for applying said current sensor control signal to said controllable power means for limiting the output current from said power means to a value substantially equal to the value of said motor's normal operating current.

said current sensor control signal being operative during motor acceleration, and said voltage sensor control signal being operative during motor-stabilized operation.

2. In combination with a motor whose starting inrush-current is substantially larger than said motor's normal operation current, the combination comprising:

I. controllable power converter means for providing controllable current and voltage to said motor;

II. means for limiting the output current from said converter to a value that is substantially equal to the value of said motor's normal operating current, said limiting means comprising A. current sensor means for sensing the instantaneous current drawn by said motor, and producing a current sensor control signal corresponding to said instantaneous motor current;

B. means for applying said current sensor control signal to said controllable power converter for continually limiting the output current from said power converter to a value substantially equal to the value of said motor's normal operating current;

III. means for controlling the output voltage from said power converter to a value suitable to maintain motor synchronism, said voltage control means comprising C. voltage sensor means for sensing the instantaneous voltage at said motor, and producing a voltage sensor control signal corresponding to said instantaneous voltage;

D. means for applying said voltage sensor control signal to said controllable power converter;

IV. means for causing said current sensor control signal to be operative during motor acceleration, and for causing said voltage sensor control signal to be operative during motor-stabilized operation.

3. The combination of claim 2 wherein said last means comprises a voltage signal switch connected between said voltage sensor means and said converter; and means for applying at least one of said current sensor control signals to said voltage signal switch for controlling the state of said voltage signal switch.

4. The combination of claim 2, wherein said last means comprises a current signal switch connected between at least one of said current sensors and said converter; and means for applying at least one of said current sensor control signals to said current signal switch, for controlling the state of said current signal switch.

5. The combination of claim 2 wherein said last means comprises a voltage signal switch connected between said converter;

means for applying at least one of said current sensor control signals to said voltage signal switch for controlling said voltage signal switch;

a current signal switch connected between at least one of said current sensors and said converter; and means for applying at least one of said current sensor control signals to said current signal switch for controlling said current signal switch.

6. The combination of claim 2 wherein said last means comprises universal switch means, connected to the input of said converter, for determining which control signals are applied to said converter;

means for applying said current sensor control signals to said universal switch;

means for applying said voltage sensor control signals to said universal switch; and means for applying at least one of said current sensor control signals to said universal switch for controlling the state thereof.

7. In combination with a multiphase AC motor whose starting inrush current is substantially larger than said motor's normal operation current, the combination comprising:

I. controllable multiphase power converter means for providing multiphase controllable current and voltage to said motor;

II. means for continually limiting the output current from each phase of said converter to a value that is substantially equal to the value of said motor's normal operating current, said limiting means comprising A. current sensor means, positioned in at least one of said phases, for sensing the instantaneous current drawn by said phase of said motor, and producing a current sensor control signal corresponding to said instantaneous motor current;

B. means for applying said current sensor control signal to said controllable power converter for continually limiting the output current from said phase of said power converter to a value substantially equal to the value of said motor's normal operating current;

III. means for controlling the output voltage from said power converter to a value suitable to maintain motor synchronism, said voltage control means comprising C. voltage sensor means for sensing the instantaneous voltage of at least one phase at said motor, and producing a voltage sensor control signal corresponding to said instantaneous voltage;
D. means for applying said voltage sensor control signal to said controllable power converter;

IV. means for causing said current sensor control signal to be operative during motor acceleration, and for causing said voltage sensor control signal to be operative during motor-stabilized operation.